(12) United States Patent
Lovett et al.

(10) Patent No.: US 8,347,594 B1
(45) Date of Patent: Jan. 8, 2013

(54) PIVOTING MOUNT FOR A KNIFE DRIVE

(75) Inventors: Benjamin M. Lovett, Colona, IL (US); Benjamin J. Schlesser, Bettendorf, IA (US); Bruce A. Coers, Hillsdale, IL (US); Austin William Hughes, Kaysville, UT (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/280,724

(22) Filed: Oct. 25, 2011

(51) Int. Cl.
*A01D 34/13* (2006.01)
(52) U.S. Cl. .......................................... 56/296; 56/257
(58) Field of Classification Search .................... 56/296, 56/297, 257, 303; 74/44, 60
See application file for complete search history.

(56) References Cited

U.S. PATENT DOCUMENTS

| 2,438,065 | A | * | 3/1948 | Love ................................ 56/303 |
| 3,941,003 | A | * | 3/1976 | Garrison et al. ................... 74/44 |
| 4,091,602 | A | * | 5/1978 | Williams et al. ............... 56/14.4 |
| 4,191,006 | A | * | 3/1980 | Kerber et al. .................. 56/11.6 |
| 4,813,296 | A | * | 3/1989 | Guinn ............................. 74/595 |
| 4,815,265 | A | * | 3/1989 | Guinn et al. .................... 56/297 |
| 4,909,025 | A | * | 3/1990 | Reissig et al. .................. 56/257 |
| 7,121,074 | B1 | * | 10/2006 | Regier et al. .................... 56/296 |
| 7,810,304 | B2 | * | 10/2010 | Priepke ........................... 56/257 |
| 7,836,671 | B2 | * | 11/2010 | Sauerwein et al. ............. 56/296 |
| 7,877,976 | B2 | * | 2/2011 | Honas et al. .................... 56/208 |
| 8,024,915 | B2 | * | 9/2011 | Sauerwein et al. ............. 56/296 |
| 2009/0145097 | A1 | * | 6/2009 | Priepke ........................... 56/257 |
| 2010/0095646 | A1 | * | 4/2010 | Schmidt et al. ................ 56/14.3 |

* cited by examiner

*Primary Examiner* — Arpad Fabian-Kovacs

(57) ABSTRACT

A draper platform (100) has a knife drive (250) for driving a knife assembly (140) that is supported on and between two adjacent support arms (246) that pivot with respect to each other and with respect to the frame (102, 104, 106) of the draper platform (100) to which the two adjacent support arms (246A, 246B) are pivotally connected. two resilient mounts couple opposing sides fo he sub-frame to the two adjacent support arms.

14 Claims, 3 Drawing Sheets

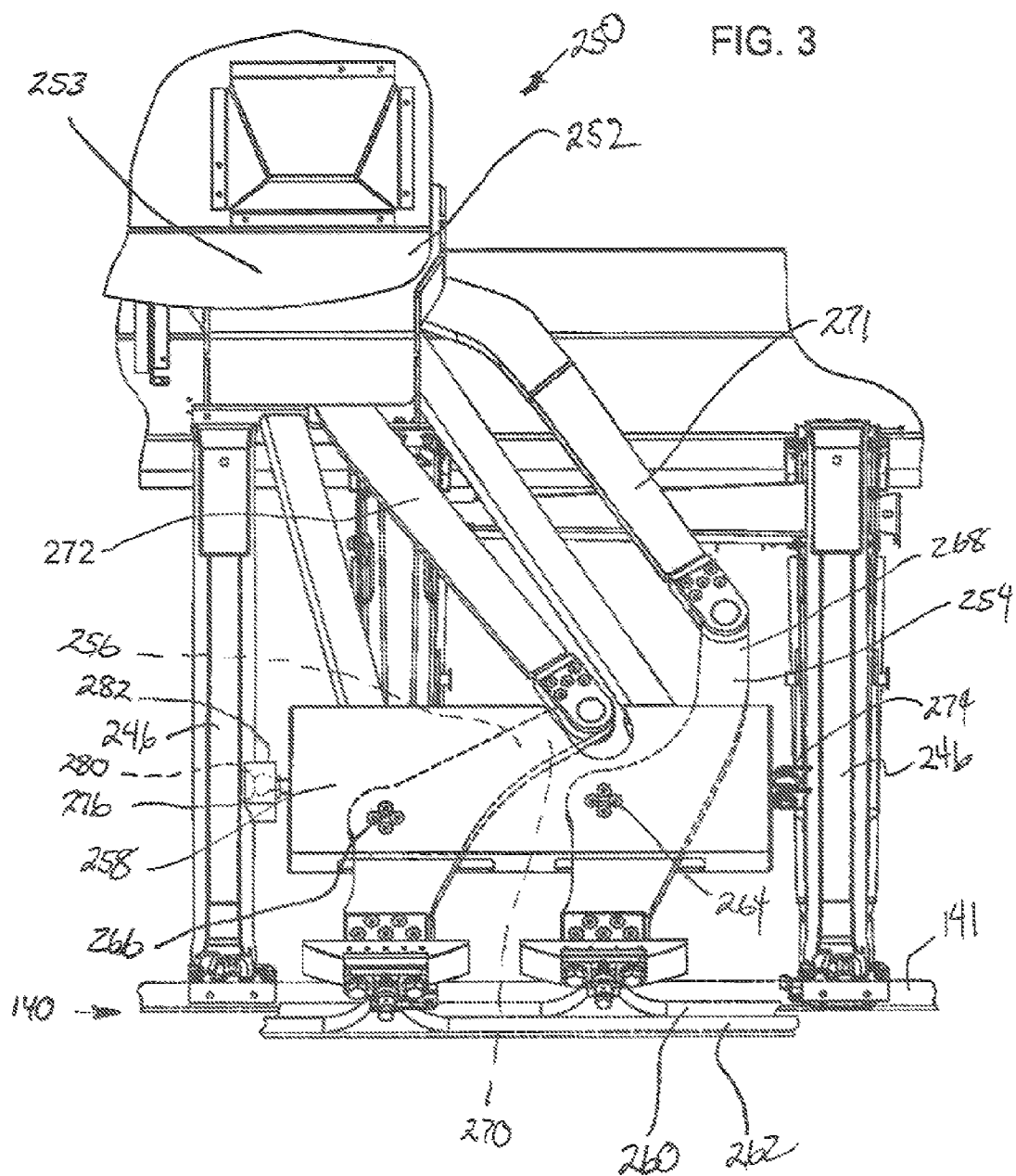

PIVOTING MOUNT FOR A KNIFE DRIVE

FIELD OF THE INVENTION

The present invention relates to agricultural combine harvesting machinery, and more particularly to draper headers. Even more particularly it refers to reciprocating knife drives for draper headers.

BACKGROUND OF THE INVENTION

Combines are large self-propelled vehicles used for harvesting and threshing agricultural crop in the field. A harvesting head is typically disposed across the front of the combine vehicle supported on a feederhouse. This harvesting head is configured to cut and convey the crop into the combine vehicle itself where it is threshed, separated, and cleaned.

Traditional harvesting heads included an elongate rigid frame to which harvesting implements are added such as row units, reciprocating knife assemblies, augers, reels, and endless belt conveyors. One such type of harvesting head is called a "draper platform", "draper header", or more generally a "draper".

Draper platforms have an elongate frame on which are mounted left and right side endless belt conveyors mounted immediately behind a reciprocating knife. These endless conveyors convey cut crop material inward to a center portion of the draper platform, depositing them on a center conveyor that moves rearward. The center conveyor carries the material to and through an aperture at the rear of the draper platform frame, where it is deposited in an elevating conveyor called a feederhouse, which carries the cut crop material into the combine vehicle for threshing, separating and cleaning.

In one arrangement, the reciprocating knife is mounted on pivoting support arms that extend forward from a rear transverse frame member. See US 2009/0249760 A1, FIGS. 1-11, in which the conveyors are stationary and the reciprocating knife moves up and down on parallelogram arms. This arrangement permits the entire cutter bar to flex up and down, severing the crop plants close to the ground.

In another arrangement, the left and right side conveyors have also been mounted on pivoting support arms. These support arms are generally horizontal and are pivotally connected to an elongate laterally extending frame member at their rear ends, and are connected to and support a reciprocating knife at their front ends. The pivoting arms permit both the conveyor belts and the reciprocating knife to move up and down to follow the terrain.

Prior art knife drives have been rigidly supported on arms extending forward from the frame of the draper platforms. This rigid support prevents the arms on which they are mounted from being pivotally coupled to the frame to thereby flex and follow the ground.

The problem to be solved is that of providing a flexible support for the knife drive elements such that the arms supporting the knife drive can pivot up and down to follow the terrain. This problem is solved by the arrangement described in claim 1. Further advantages are provided by additional claims that are dependent upon claim 1.

SUMMARY OF THE INVENTION

In accordance with a first embodiment of the invention, a draper platform for mounting on a feederhouse of an agricultural combine is provided, the draper platform having a forward direction of operational travel over the ground and an overall width in a direction transverse to the forward direction, the draper platform comprising a frame, wherein said frame is elongate and extends generally perpendicularly to the forward direction and extends generally parallel to the ground, a plurality of reciprocating knife support arms that extend in the forward direction and are pivotally coupled at the rear of the plurality of support arms to the frame, to pivot generally up and down at their forward ends about their pivotal connections to the frame and with respect to the frame, a reciprocating knife assembly that is elongate and extends laterally across substantially the entire overall width of the draper platform, wherein said reciprocating knife assembly is disposed at a forward edge of the draper platform, wherein said reciprocating knife assembly is connected to and supported on forward ends of the plurality of support arms, wherein the reciprocating knife assembly is configured to flex and to thereby permit each support arm of the plurality of support arms to independently pivot up and down with respect to adjacent ones of the plurality of support arms, and a reciprocating knife drive comprising a sub-frame that is disposed between and supported on two adjacent support arms of said plurality of support arms, a first pivoting drive member having a front end and a rear end, the first pivoting drive member being supported on the sub-frame at a first pivot so as to pivot with respect to the sub-frame about a first generally vertical axis.

The sub-frame may be pivotally coupled to the two adjacent support arms with first and second resilient mounts to permit the two adjacent support arms to pivot up and down with respect to each other. The first and second resilient mounts may be fixed to opposite sides of the sub-frame. The first and second resilient mounts may be fixed to facing sidewalls of the two adjacent support arms. The second resilient mount may be a ball joint. The draper platform may further comprise a second pivoting drive member having a front end and a rear end, the second pivoting drive member being supported on the sub-frame at a second pivot to pivot with respect to the sub-frame about a second generally vertical axis. The first and second generally vertical axes are parallel and spaced apart from each other in a direction transverse to the forward direction.

In accordance with a second aspect of the invention, a reciprocating drive assembly is provided for a draper platform for mounting on a feederhouse of an agricultural combine, the draper platform having a forward direction of operational travel over the ground and an overall width in a direction transverse to the forward direction, the draper platform comprising a frame, wherein said frame is elongate and extends generally perpendicularly to the forward direction and extends generally parallel to the ground, a plurality of reciprocating knife support arms that extend in the forward direction and are pivotally coupled at the rear of the plurality of support arms to the frame, to pivot generally up and down at their forward ends about their pivotal connections to the frame and with respect to the frame, and a reciprocating knife assembly that is elongate and extends laterally across substantially the entire overall width of the draper platform, wherein said reciprocating knife assembly is disposed at a forward edge of the draper platform, wherein said reciprocating knife assembly is connected to and supported on forward ends of the plurality of support arms, wherein the reciprocating knife assembly is configured to flex and to thereby permit each support arm of the plurality of support arms to independently pivot up and down with respect to adjacent ones of the plurality of support arms, wherein the reciprocating knife drive comprises a sub-frame that is disposed between and supported on two adjacent support arms of said plurality of support arms; a first pivoting drive member having a front end and a rear end, the first pivoting drive member being supported on the sub-frame at a first pivot so as to pivot with respect to the sub-frame about a first generally vertical axis.

The subframe may be configured to be pivotally coupled to the two adjacent support arms with first and second resilient mounts to permit the two adjacent support arms to pivot up and down with respect to each other. The first and second resilient mounts may be configured to be fixed to opposite sides of the sub-frame. The first and second resilient mounts may be configured to be fixed to facing sidewalls of the two adjacent support arms. The second resilient mount may be a ball joint. The reciprocating knife drive may further comprise a second pivoting drive member having a front end and a rear end, the second pivoting drive member being supported on the sub-frame at a second pivot to pivot with respect to the sub-frame about a second generally vertical axis. The first and second generally vertical axes may be parallel and may be spaced apart from each other in a direction transverse to the forward direction.

BRIEF DESCRIPTION OF THE DRAWINGS

FIG. 3 is a fragmentary detail perspective view of the draper platform of FIGS. 1-2 showing the reciprocating knife drive in greater detail and its arrangement between adjacent support arms of the draper platform.

DETAILED DESCRIPTION OF THE PREFERRED EMBODIMENT

The terms "front", "in front of", "forward", "fore-and-aft", "rear", "behind", "rearward", and the like as used herein are made in reference to "V" (FIG. 1), which is the direction of travel through the field during normal, straight-line, harvesting operations. The direction of travel is horizontal and perpendicular to the longitudinal extent of the draper platform. The terms "transverse" "side-to-side", and the like refer to a direction generally parallel to the longitudinal extent of the draper. This direction is horizontal and transverse to the direction of travel "V" of the draper platform.

Below, the application describes the construction and operation of structures on the left side of the draper platform. The construction and operation of the right side of the draper platform is identical to the construction and operation of the left side of the draper platform in every respect, but is constructed as a mirror image of the left side.

Figure 1:
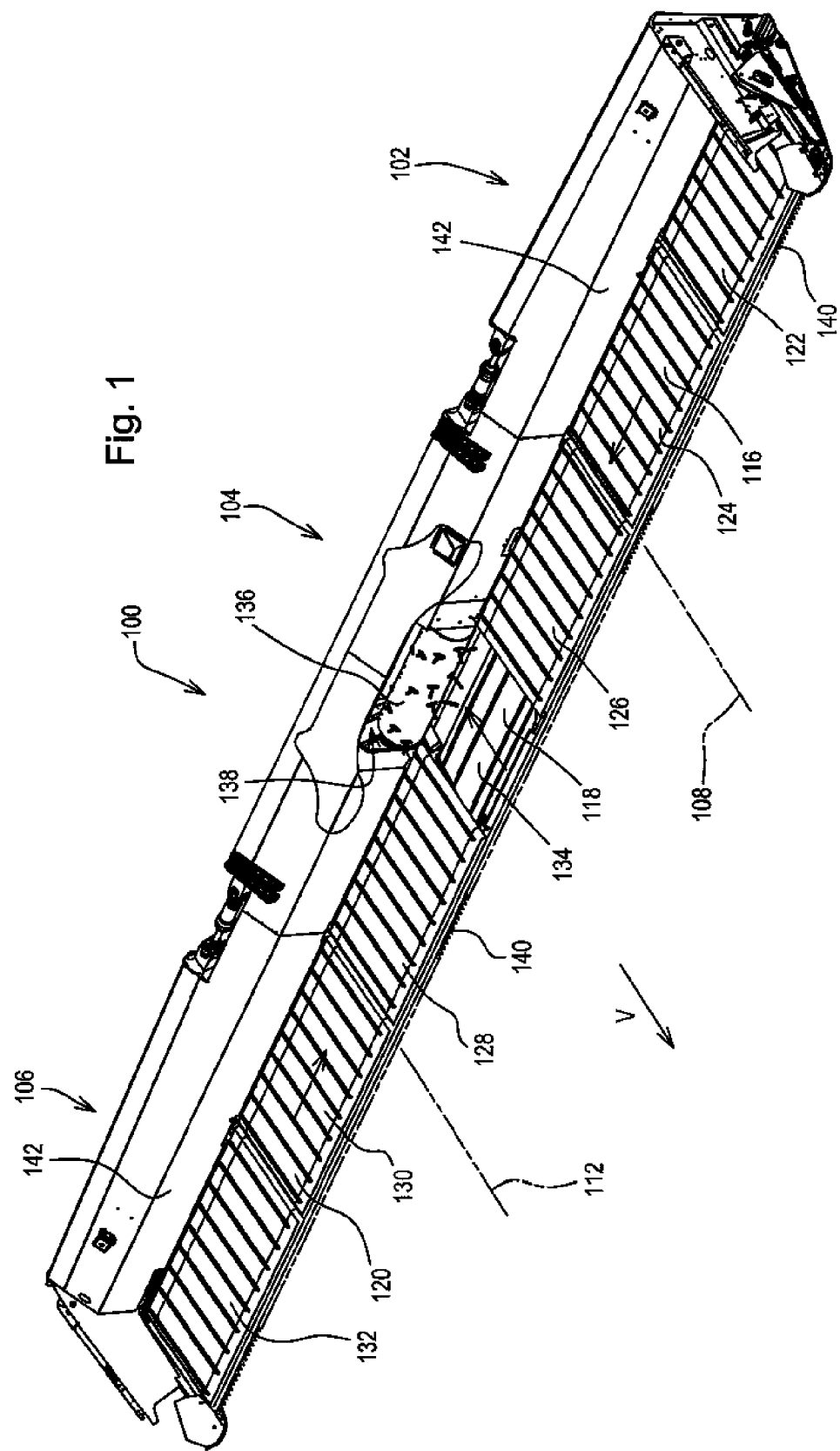
FIG. 1 is a perspective view of a draper platform in accordance with the present invention.
Figure 2:
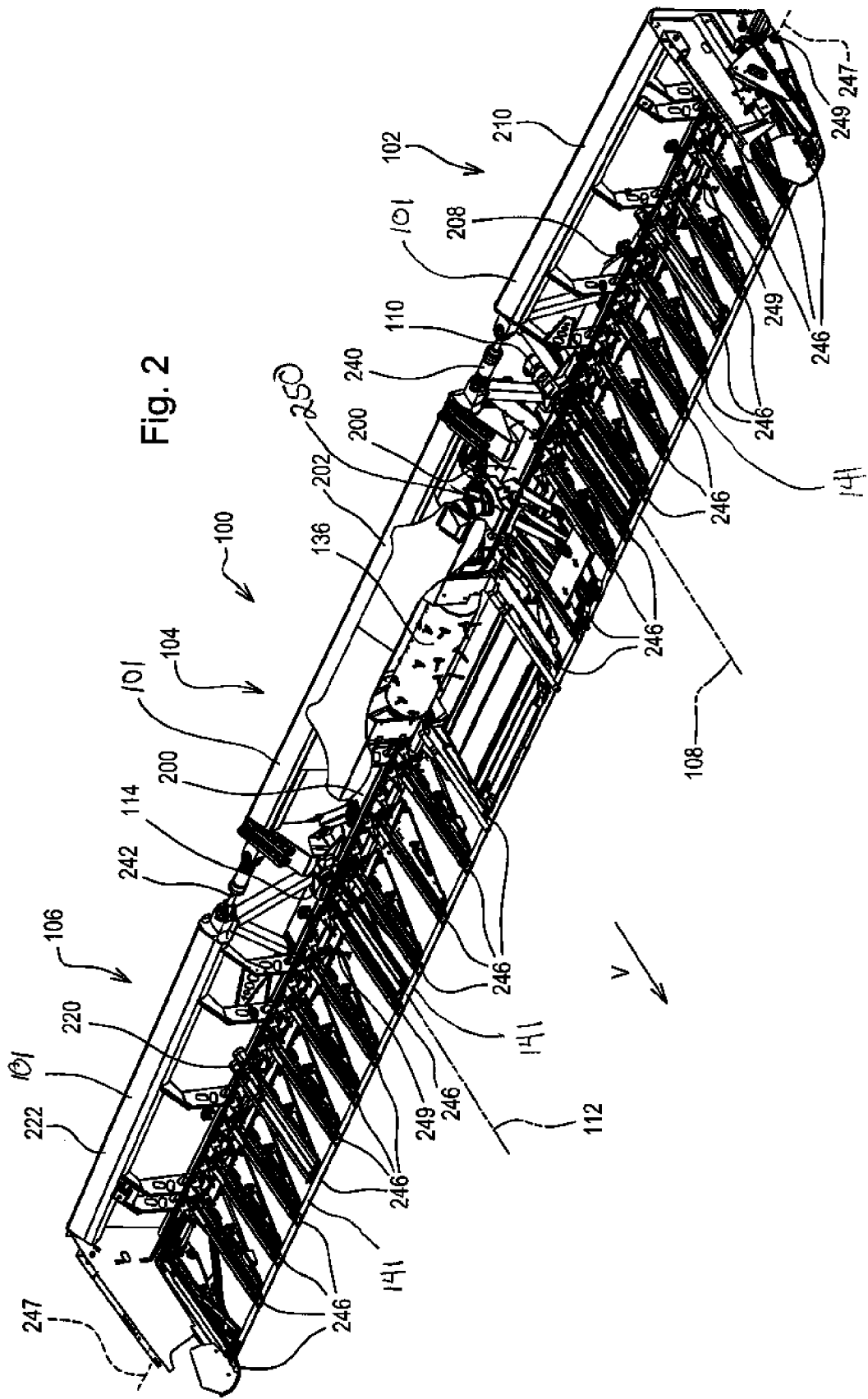
FIG. 2 is a perspective view of the draper platform of FIG. 1 with the conveyor belts and back sheets removed.

In FIGS. 1 and 2, a draper platform 100 is comprised of an elongate and laterally extending frame 101 comprising left frame section 102, a center frame section 104, and a right frame section 106. These three frame sections are coupled to one another and extend linearly, laterally and horizontally in an end-to-end relationship. Left frame section 102 pivots about a generally horizontal and forwardly extending axis 108 with respect to center frame section 104. This axis is defined by pivot joint 110. Pivot joint 110 couples left frame section 102 and center frame section 104 together and constrains them to pivot about axis 108. Right frame section 106 pivots about a generally horizontal and forwardly extending axis 112 with respect to center frame section 104. This axis is defined by pivot joint 114. Pivot joint 114 couples right frame section 106 and center frame section 104 together and constrains them to pivot with respect to each other about axis 112.

Draper platform 100 further comprises a left side endless belt conveyor 116, a center endless belt conveyor 118, and a right side endless belt conveyor 120. Left side endless belt conveyor 116 is comprised of 3 separate endless conveyor belts 122, 124, 126. Right side endless belt conveyor 120 is comprised of 3 separate endless conveyor belts 128, 130, 132. Endless conveyor belts 122, 124, 126, 128, 130, 132 have upper surfaces that are coplanar and are driven by motors (not shown) to carry cut crop material laterally inwardly in the direction (indicated by the arrows that are superimposed on the conveyors) toward the center portion of draper platform 100, where they deposit their cut crop material onto endless conveyor belt 134 of center endless belt conveyor 118. Endless conveyor belt 134 is driven by a motor (not shown) to carry cut crop material rearwardly in the direction indicated by the arrow superimposed on endless conveyor belt 134. Endless conveyor belt 134 carries the cut crop material rearward and underneath guide roller 136. Guide roller 136, in turn, carries the cut crop material rearward on the upwardly facing top surface of the center conveyor belt, through central aperture 138 disposed at the rear wall of draper platform 100. Cut crop material passing through central aperture 138 is received in a feederhouse (not shown) of an agricultural combine (also not shown) in the conventional manner.

An elongate reciprocating knife assembly 140 is disposed along the leading edge of the draper platform 100, extending substantially the entire width of the draper platform. The elongate reciprocating knife assembly 140 is configured to sever crop plants near their roots, permitting the upper portion of the crop plant to fall on the left side endless belt conveyor 116, center endless belt conveyor 118 and right side endless belt conveyor 120. A reel (not shown) is disposed above the elongate reciprocating knife assembly 140 and is configured to engage the tops of the crop plants, gently pushing them rearward such that they fall onto endless belt conveyors 116, 118, and 120. The conveyors and the elongate reciprocating knife assembly are connected to and supported on reciprocating knife support arms 246 (FIG. 2)

Back sheets 142 extend generally vertically from the rear edge of endless conveyor belts 122, 124, 126, 134, 128, 130, 132. These back sheets serve as a backstop or barrier to prevent cut crop material from passing completely across draper platform 100 and falling on the ground. Back sheets 142 terminate at the aperture and define the opposing sides of central aperture 138.

As the draper platform travels over the ground, the ground presses upward on skid shoes mounted on the bottom of the reciprocating knife assembly 140 causing the elongate reciprocating knife assembly 140 to move up and down and flex independently along its length as the skids shoes drag along the ground following the undulating ground terrain. The elongate reciprocating knife assembly is mounted at the leading edge of the draper platform on support arms 246 (FIG. 2). The support arms 246, in turn, flex up and down to accommodate the movement of the reciprocating knife.

In FIG. 2, back sheets 142 have been removed for ease of illustration, as have endless conveyor belts 122, 124, 126, 128, 130, and 132, and the cutting and reciprocating elements of elongate reciprocating knife assembly 140.

Center frame section 104 comprises a horizontal and laterally extending beam 200 that is coupled to a horizontally and laterally extending beam 202. Beam 202 is parallel to and disposed above beam 200. Cross members couple beams 200, 202 together to provide a rectangular framework.

In a similar fashion, left frame section 102 is comprised of a horizontally and laterally extending beam 208 that is coupled to a horizontally and laterally extending beam 210.

Beam 210 is parallel to and disposed above beam 208. Cross members extend between and couple beams 208, 210 together to form left frame section 102.

In a similar fashion, the frame of right frame section 106 is comprised of a horizontally and laterally extending beam 220 that is coupled to a horizontally and laterally extending beam 222. Beam 222 is parallel to and disposed above beam 220. Cross members extend between and couple beams 222, 220 together to form right frame section 106.

The left end of beam 200 and the right end of beam 208 are coupled together by a pivot joint 110. Pivot joint 110 couples together lower adjacent portions of left frame section 102 and center frame section 104.

The right end of beam 200 and the left end of beam 220 are coupled together by a pivot joint 114. Pivot joint 114 couples together lower adjacent portions of right frame section 106 and center frame section 104.

The left end of beam 202 and the right end of beam 210 are coupled together by an elongate member 240. Elongate member 240 couples together upper adjacent portions of left frame section 102 and center frame section 104.

The right end of beam 202 and the left end of beam 222 are coupled together by an elongate member 242. Elongate member 242 couples together upper adjacent portions of right frame section 106 and center frame section 104.

A plurality (e.g. 26) of support arms 246 are pivotally coupled to beams 200, 208, and 220 at the rear ends of arms 246 such that the arms can pivot up and down at the forward ends of arms 246 as the draper platform 100 travels through the agricultural field harvesting crops. Beams 200, 208, 220 extend substantially horizontally and transversely to the direction of travel "V".

Support arms 246 are fixed to an elongate stationary part 141 of the elongate reciprocating knife assembly 140 that is disposed at the forward ends of arms 246. The elongate stationary part 141 is in the form of a thin steel strip that extends horizontally and transversely and substantially the entire width of the draper platform 100. Elongate reciprocating knife assembly 140 (including the elongate stationary part 141) is designed with sufficient flexibility (due to its relative thinness in the vertical direction) such that individual support arms 246 can move up and down with respect to adjacent support arms 246 as the support arms 246 follow the terrain of the agricultural field. The stationary part 141 of the elongate reciprocating knife assembly 140 can flex between these adjacent arms to permit this relative movement.

Support arms 246 are all disposed generally horizontally and extend forward and slightly downward from the rear pivot of each support arm 246. The support arms 246 are spaced parallel to each other. Each support arm 246 is preferably spaced equidistant from its immediately adjacent support arms 246.

In FIG. 3, reciprocating knife drive 250 is supported on the frame 101 and on adjacent support arms 246 and drives the reciprocating knife assembly 140. The reciprocating knife drive 250 comprises a motor assembly 252, a first pivoting drive member 254, a second pivoting drive member 256, and a sub-frame 258. Sub-frame 258 is generally planar, having parallel top and bottom panels that are joined together to provide a space therebetween for receiving and supporting the members 254 and 256. Sub-frame 258 and the members 254 and 256 are disposed between the upper run of endless belt 126 and the lower run of endless belt 126.

Elongate reciprocating knife assembly 140 includes a first reciprocating knife section 260 and a second reciprocating knife section 262 (FIG. 3) that are supported on the front ends of the pivoting support arms 246 such that they flex up and down as the support arms 246 flex up and down, and also reciprocate back and forth as the reciprocating knife drive 250 reciprocates back and forth.

Many triangular cutting blades (FIG. 1) are fixed in a row to each of the reciprocating knife sections 260 and 262 and extend forward of the reciprocating knife sections across substantially the entire width of the draper platform. It is these knife blades that engage and sever the crop plant stalks.

Each reciprocating knife section 260 and 262 extends across approximately half of the draper platform and overlaps the other reciprocating knife section in the middle of the draper platform where the reciprocating knife drive is located. The front ends of the first pivoting drive member 254 and the second pivoting drive member 256 are drivingly coupled to the first reciprocating knife section 260 and second reciprocating knife section 262, respectively, to drive these knife sections side-to-side in a direction generally transverse to the forward direction of travel of the draper platform 100.

The first pivoting drive member 254 and the second pivoting drive member 256 are mounted to pivot with respect to the sub-frame 258 about a first pivot 264 and a second pivot 266, respectively, on the sub-frame 258. They are mounted to the sub-frame 258 at their midpoints, approximately.

Pivots 264 and 266 constrain the members 254 and 256, respectively, to pivot about parallel axes of rotation, said axes extending generally perpendicular to the planar extent of sub-frame 258 and to the upper run of conveyor belt 126.

The motor assembly 252 includes a motor and gearbox 253 and first and second reciprocating members 271 and 272 that both extend from and are driven in reciprocation by the motor and gearbox 253. The forward ends of the first and second reciprocating members 271 and 272 are pivotally and drivingly coupled to a first rear end 268 of the first pivoting drive member 254 and a second rear end 270 of the second pivoting drive member 256, respectively. The first reciprocating knife section 260 and the second reciprocating knife section 262 are respectively coupled to the drive members 254 and 255 of the motor assembly 252 and are driven thereby.

Sub-frame 258 is supported on a first resilient mount 274 located on the left side of the sub-frame 258 and a second resilient mount 276 located on the right side (i.e. the opposite side) of sub-frame 258. The resiliency of the mounts permits the pivoting support arms 246 that support the sub-frame to pivot up and down with respect to each other during normal operation without damaging the support arms 246, the reciprocating knife 140, or the reciprocating knife drive 250.

Resilient mount 274 is preferably the same as the mounts disclosed in co-pending application, U.S. application Ser. No. 13/112,223, (which is incorporated herein by reference for all that it teaches) and are described therein as supporting a center conveyor to permit relative movement of two adjacent pivoting support arms 246.

Resilient mount 276 comprises a ball and socket arrangement including a ball 280, a ball mount 282. The ball 280 is supported in the ball mount 282 to be pivotable about the center of the ball 280.

This support arrangement permits the two pivoting support arms 246 that support the sub-frame 258 to move up and down while still supporting the sub-frame 258.

What is claimed is:

1. A draper platform for mounting on a feederhouse of an agricultural combine, the draper platform having a forward direction of operational travel over the ground and an overall width in a direction transverse to the forward direction, the draper platform comprising:

a frame (102, 104, 106), wherein said frame (102, 104, 106) is elongate and extends generally perpendicularly to the forward direction and extends generally parallel to the ground;

a plurality of reciprocating knife support arms (246) that extend in the forward direction and are pivotally coupled at the rear of the plurality of support arms to the frame (102, 104, 106), to pivot generally up and down at their forward ends about their pivotal connections to the frame (102, 104, 106) and with respect to the frame (102, 104, 106);

a reciprocating knife assembly (140) that is elongate and extends laterally across substantially the entire overall width of the draper platform (100), wherein said reciprocating knife assembly (140) is disposed at a forward edge of the draper platform, wherein said reciprocating knife assembly (140) is connected to and supported on forward ends of the plurality of support arms (246), wherein the reciprocating knife assembly (140) is configured to flex and to thereby permit each support arm (246) of the plurality of support arms (246) to independently pivot up and down with respect to adjacent ones of the plurality of support arms (246); and a reciprocating knife drive (250) comprising a sub-frame (258) that is disposed between and supported on two adjacent support arms (246) of said plurality of support arms (246), a first pivoting drive member (254) having a front end pivotally connected to the reciprocating knife assembly (140) and a rear end pivotally connected to said reciprocating knife drive (250), the first pivoting drive member (254) being supported on the sub-frame (258) at a first pivot (264) to pivot with respect to the sub-frame (258) about a first generally vertical axis.

2. The draper platform of claim 1, wherein the subframe (258) is pivotally coupled to the two adjacent support arms (246) with first and second resilient mounts (274, 278) to permit the two adjacent support arms (246) to pivot up and down with respect to each other.

3. The draper platform of claim 2, wherein the first and second resilient mounts (274, 278) are fixed to opposite sides of the sub-frame (258).

4. The draper platform of claim 3, wherein the first and second resilient mounts (274, 276) are fixed to facing sidewalls of the two adjacent support arms (246).

5. The draper platform of claim 4, wherein the second resilient mount (276) is a ball joint.

6. The draper platform of claim 1, further comprising a second pivoting drive member (256) having a front end and a rear end, the second pivoting drive member (258) being supported on the sub-frame (258) at a second pivot (266) to pivot with respect to the sub-frame (258) about a second generally vertical axis.

7. The draper platform of claim 6, wherein the first and second generally vertical axes are parallel and spaced apart from each other in a direction transverse to the forward direction.

8. In a draper platform for mounting on a feederhouse of an agricultural combine, the draper platform having a forward direction of operational travel over the ground and an overall width in a direction transverse to the forward direction, the draper platform comprising a frame (102, 104, 106), wherein said frame (102, 104, 106) is elongate and extends generally perpendicularly to the forward direction and extends generally parallel to the ground, a plurality of reciprocating knife support arms (246) that extend in the forward direction and are pivotally coupled at the rear of the plurality of support arms to the frame (102, 104, 106), to pivot generally up and down at their forward ends about their pivotal connections to the frame (102, 104, 106) and with respect to the frame (102, 104, 106), and a reciprocating knife assembly (140) that is elongate and extends laterally across substantially the entire overall width of the draper platform (100), wherein said reciprocating knife assembly (140) is disposed at a forward edge of the draper platform, wherein said reciprocating knife assembly (140) is connected to and supported on forward ends of the plurality of support arms (246), wherein the reciprocating knife assembly (140) is configured to flex and to thereby permit each support arm (246) of the plurality of support arms (246) to independently pivot up and down with respect to adjacent ones of the plurality of support arms (246), and a reciprocating knife drive (250) supported on the frame (102, 104, 106) and coupled by drive structure for driving said knife assembly 140), the improvement comprising:

said drive structure including a sub-frame (258) that is disposed between and supported on two adjacent support arms (246) of said plurality of support arms (246); and further including a first pivoting drive member (254) having a front end pivotally connected to the reciprocating knife assembly (140) and a rear end pivotally connected to the reciprocating knife drive (250), the first pivoting drive member (254) being supported on the sub-frame (258) at a first pivot (264) to pivot with respect to the sub-frame (258) about a first generally vertical axis.

9. The draper platform of claim 8, wherein the sub-frame (258) is pivotally coupled to the two adjacent support arms (246) with first and second resilient mounts (274, 278) to permit the two adjacent support arms (246) to pivot up and down with respect to each other.

10. The draper platform of claim 9, wherein the first and second resilient mounts (274, 278) are fixed to opposite sides of the sub-frame (258).

11. The draper platform of of claim 10, wherein the first and second resilient mounts (274, 278) are fixed to facing sidewalls of the two adjacent support arms (246).

12. The draper platform of claim 11, wherein the second resilient mount (276) is a ball joint.

13. The draper platform of claim 8, further comprising a second pivoting drive member (256) having a front end pivotally connected to the reciprocating knife assembly (140) and a rear end pivotally connected to the reciprocating knife drive (250), the second pivoting drive member (256) being supported on the sub-frame (258) at a second pivot (266) to pivot with respect to the sub-frame (258) about a second generally vertical axis.

14. The draper platform of claim 13, wherein the first and second generally vertical axes are parallel and spaced apart from each other in a direction transverse to the forward direction.

* * * * *